US006378005B1

(12) United States Patent
Hyder et al.

(10) Patent No.: US 6,378,005 B1
(45) Date of Patent: *Apr. 23, 2002

(54) METHOD, COMPUTER PROGRAM PRODUCT, AND SYSTEM FOR SEPARATING CONNECTION MANAGEMENT FUNCTIONALITY FROM A CONNECTION-ORIENTED DEVICE DRIVER

(75) Inventors: Jameel Hyder, Redmond; Arvind Madhav Murching, Issaguah, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/097,293

(22) Filed: Jun. 12, 1998

(51) Int. Cl.$^7$ ................................................ G06F 9/54
(52) U.S. Cl. ....................................... 709/321; 709/250
(58) Field of Search ................................. 709/227, 250, 709/321, 322, 327

(56) References Cited

U.S. PATENT DOCUMENTS

| | | | | |
|---|---|---|---|---|
| 5,673,394 A | * | 9/1997 | Fenwick et al. | 709/302 |
| 5,745,790 A | * | 4/1998 | Oskouy | 710/33 |
| 5,778,180 A | * | 7/1998 | Gentry et al. | 709/212 |
| 5,838,921 A | * | 11/1998 | Speeter | 709/227 |
| 5,852,719 A | * | 12/1998 | Fishler et al. | 709/216 |
| 5,859,979 A | * | 1/1999 | Tung et al. | 709/208 |
| 5,898,841 A | * | 4/1999 | Higgins | 709/236 |
| 5,974,444 A | * | 10/1999 | Konrad | 709/203 |
| 6,081,846 A | * | 6/2000 | Hyder et al. | 709/250 |
| 6,292,827 B1 | * | 9/2001 | Raz | 709/217 |

* cited by examiner

Primary Examiner—St. John Courtenay, III
Assistant Examiner—Van H. Nguyen
(74) Attorney, Agent, or Firm—Workman, Nydegger & Seeley

(57) ABSTRACT

In an I/O subsystem comprising device drivers for controlling connection-oriented hardware adapters, a method, computer program product, and system is presented that allows the connection functionality for a particular media to be separated from a connection-oriented device driver. An integrating component allows data transport drivers and hardware device drivers to be "bound" together to form data communication channels in an arbitrary fashion without knowledge beforehand as to configuration; each are programmed to the integrating component. A connection interface in an enhanced integrating component allows the connection-oriented device driver development to be simplified and result in smaller, less complex device drivers because the driver is no longer required to provide a connection interface. By adding a connection manager interface to the integrating component, a connection manager component may be added to the system that handles connection management for a media type, such as ATM, ISDN, etc. A single connection manager component may support the hardware adapters provided by multiple manufacturers. This allows the manufacturers to develop connection-oriented device drivers more quickly since they will not have the connection management functionality, a sizable piece of work, nor will they be providing a connection interface.

17 Claims, 11 Drawing Sheets

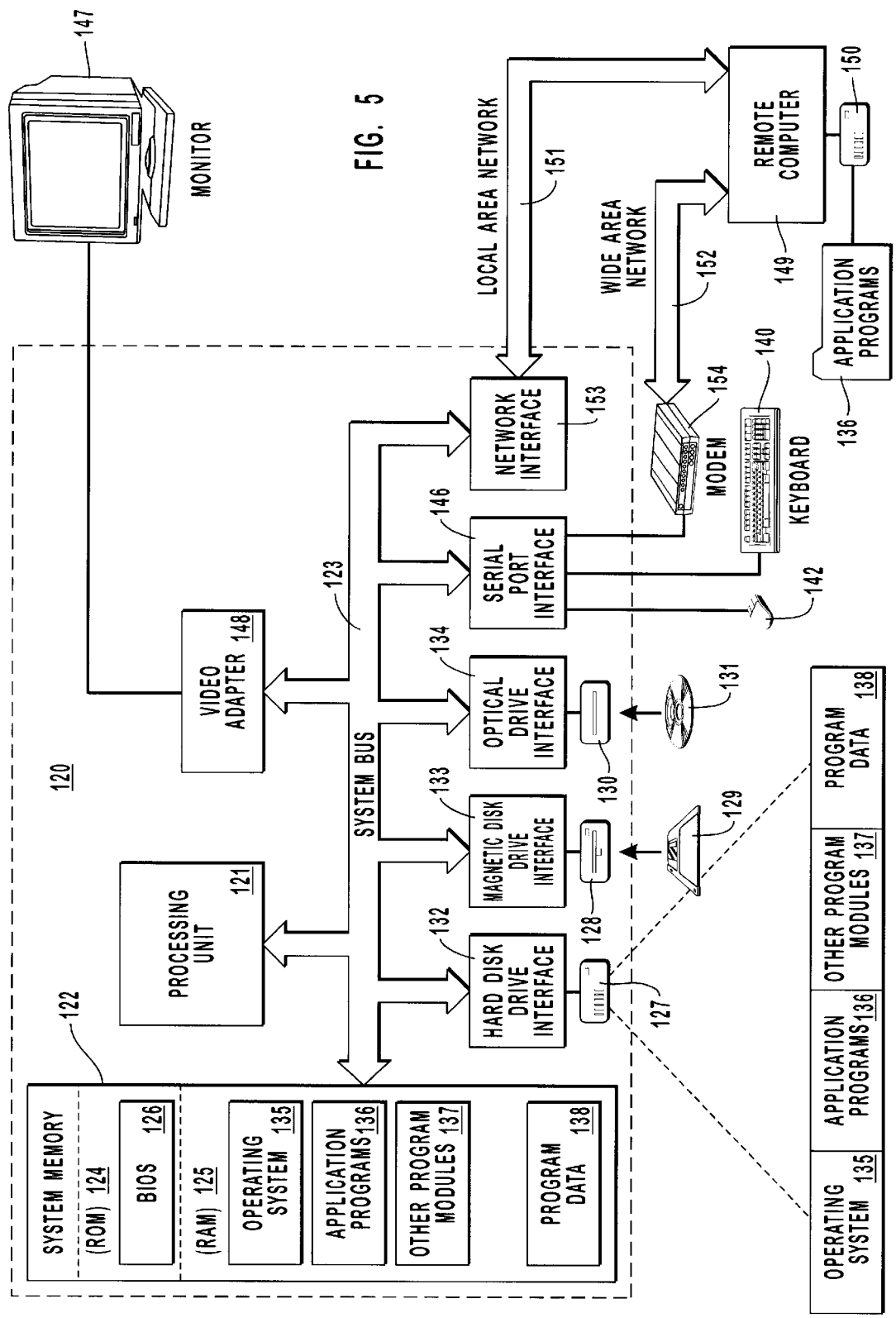

US 6,378,005 B1

METHOD, COMPUTER PROGRAM PRODUCT, AND SYSTEM FOR SEPARATING CONNECTION MANAGEMENT FUNCTIONALITY FROM A CONNECTION-ORIENTED DEVICE DRIVER

BACKGROUND OF THE INVENTION

1. The Field of the Invention

The present invention relates to methods for managing connection-oriented hardware media in an I/O subsystem of a computer operating system. More particularly, the present invention relates to an integrating component that provides a generalized interface for connection management so that the individual device drivers for connection-oriented media may be written in simplified fashion while providing a uniform connection interface. Specifically, the invention deals with ways of separating the connection creation functionality away from the connection-oriented device drivers.

2. Present State of the Art

The effectiveness of general purpose stand alone computers, such as the personal computer found in most office environments and laptop computers increasingly used by professionals requiring portability, has been substantially improved by allowing communications between machines over a communications network. Such networking of computers allows the sharing of resources found on one computer with other computers in the network. For example, storage areas having files, printers, modems, and other resources may all be advantageously shared.

Data that is shared between computers can be sent in packets across a physical network connection and read by destination computers. Such packetized network data may be requests for shared resources, data, such as a file, or other information that must be communicated from one computer to the other. As used herein, the term "network data" refers to data or information that is actually transmitted over the communications network between different computers.

The physical network between the different computers can be categorized into two general types. The first type of network makes use of a "connectionless" media wherein the packetized network data contains destination information, such as a network address, and is simply placed on the network by the hardware media (hereinafter referred to simply as "media") and routed to the destination. A common network interface card that provides access to an Ethernet would be an example of a connectionless media. The destination will recognize the address in the packet and process it accordingly while other destination nodes will simply ignore the packet since it lacks the correct address information.

Another type of physical network utilizes a connection-oriented hardware media, such as telephone modem, cable modem, or ISDN connector. With connection-oriented media, a connection must be made and maintained in addition to sending and receiving packets of information. The connection-oriented media will send and receive data packets directly with the destination node that has matching hardware and with which a connection has been made. Once data is received, it is treated in the same manner by the I/O subsystem. Connection-oriented media are commonly found for Wide Area Network (WAN) implementations.

On a particular computer or node of the network, a network interface card (NIC) or network card monitors the physical communications channel for packets destined for that computer as well as transmits packets of network data destined for other computers. A connection-oriented NIC will first have to make the connection before packets may be sent and received. Once the connection is made, the connection-oriented NIC may receive and send packets as described above depending on the nature of the connection-oriented media. Software components run on the node computer under direction or control of the operating system or architecture for managing and controlling the network card operations. Furthermore, other software components exist to further abstract the network communications channel and provide more and more general networking interfaces for higher layers using their services. The layered approach allows compartmentalization and easier development of network applications.

One model used to provide a structure for layered software component development is the seven-layer ISO model that is well known in the art. While actual implementations of the ISO model do not necessarily rigidly isolate each particular layer as a separate component exposing its own interface to layers above and below, the concepts of the model are generally applicable. For purposes of this disclosure, the lower layers of the ISO model are most at issue, namely, the data link layer implemented by a network card device driver, and the transport and network layers implemented as a transport protocol driver.

Lower level networking functions, such as are discussed throughout this application with respect to controlling a network card and initial processing of packetized network data, are handled by special system software components called drivers that integrate with a host operating system according to a specific architecture and have special privileges for accessing system resources. Throughout this application, reference will be made to the Windows NT® operating system available from Microsoft Corporation and to its specific architecture wherein lies one embodiment of the present invention. Such drivers run in "kernel mode," meaning they have higher privileges and access to system resources than do "user mode" application process threads. While specific reference is made to Windows NT concepts and terminology, those skilled in the art will recognize that many, if not most, operating systems share similarities relevant to the environment of the present invention.

Because there are different types of transport protocols developed over time by different entities for different reasons, there may be different types of transport protocol drivers acting as software components running on a single host computer system in order to provide the necessary networking capabilities for a given installation. Some common transport protocols include TCP/IP, IPX, AppleTalk®, and others. Each transport protocol driver will communicate with one or more individual network card device drivers in order to send network data over a communications network and receive incoming packets from the communications network.

Furthermore, because there are a multitude of network cards provided by numerous manufacturers, there are a corresponding large number of potential network card device drivers. In order to support fall connectivity to the transport protocol drivers, each network card device driver must support the ability to communicate with each different type of transport protocol driver. Because of the complexity of many different variations that could conceivably be connected together due to the layered component approach, building such drivers can be a time intensive process and the nature of the different interfaces each driver must use is illustrated in FIG. 1.

FIG. 1 is a block diagram showing the structure of a plurality of network cards, network card device drivers, and transport protocol drivers that each must interact with system resources and a central database or registry having connectivity information in order to operate properly. Furthermore, each transport protocol driver must support each and every network card device driver for which it may be connected and in like manner each network card device driver must support communicating with each and every transport protocol driver to which it may be connected.

If a new transport protocol driver is introduced, each network card device driver wanting to support the new transport protocol driver may require modification to the source code followed by a re-release and distribution of the executable driver code. Likewise, a new network card device driver may also require a similar re-release. Releasing and distributing software is an expensive process that software companies desire to limit as much as possible.

For example, passing network information arriving on network card 20 controlled by network card device driver 22 to the transport protocol driver 24 requires the transport protocol driver 24 and the network card device driver 22 to be fairly complex in terms of programming effort. This may take significant time for a developer or engineer to create. Note that the network card driver 22 must not only interact with the network interface card 20 but also have an interface 26 to the system resources 28 as well as an interface 30 to the registry 32 containing connectivity information. Through such interfaces and the programming entailed therein, the network card device driver 22 will receive an interrupt that a packet has been received or is available for receipt by having the system execute code in an interrupt handling routine previously registered that makes use of system resources such as RAM for storing the packet.

Furthermore, the network card device driver 22 will use the registry interface 30 to access the registry 32 connectivity information for determining which transport protocol driver(s) will receive the packetized network information. For purposes of this example, the transport driver 24 is the recipient as illustrated by connecting line 34. Note also that the network card device driver 22 must support or be able to communicate with other transport protocol drivers since a variety exist and it is not known at development time which transport protocol driver will be indicated in the control information found in the registry 32 for receiving the network data.

On the other hand, the protocol transport driver 24 must also interface with the system resources 28 and the registry 32 containing connectivity information. Again, in order to support the many available network card device drivers, each transport protocol driver will be a relatively complex software component since the precise network card device driver for interfacing is not known at the time of development.

One advance in the art that has reduced the complexity associated with developing transport protocol drivers and network card device drivers is that of an integrating component that provides an abstracted interface to transport protocol drivers developers and to network card device driver developers. FIG. 2 is a block diagram showing the introduction of an integrating component that reduces the complexity of transport protocol driver development and network card device driver development. In such an environment, an integrating component 36 will have a registry interface 38 for accessing a registry 32 of connectivity information and a system resource interface 40 for accessing system resources 28. Therefore, development of the network card device driver 42 for controlling network card 20 is greatly simplified. The network card device driver 42 must only support an interface 44 to the integrating component 36. In like manner, the transport protocol driver 46 is also further simplified as only an interface 48 to the integrating component 36 may be supported.

The complexity of interfacing directly with the system resources 26 and the registry 32 of connectivity information is now handled by the integrating component 36. Furthermore, the integrating component provides an interface to developers incorporating many services and functionality that will be common to network card drivers and transport protocol drivers allowing the drivers to be developed more efficiently.

Another inherent benefit is that all routing of packets between transport protocol drivers and network card device drivers is managed by the integrating component. A particular transport protocol driver or network card device driver does not need to know the specific interface of the other components processing the same network packet. In other words, any network card device driver written to the integrating component 36 will be able to communicate with any available transport protocol that is also written to the integrating component 36 as determined by the connectivity information contained in the registry 32 and vice versa with respect to transport protocol drivers communicating with network card device drivers.

Besides providing quicker transport network card device driver development, the use of an integrating component 36 also facilitates multi-platform support. The integrating component interface may be supported on many different platforms, effectively encapsulating the details of actual interfacing with a particular operating system and environment. A driver developer generally needs to write the driver only one time and simply recompile the driver on any system that has the integrating component 36 supported thereon.

One technology for integrating network card device drivers to transport protocol drivers is the Network Driver Interface Specification (NDIS) technology implemented on the Windows NT operating system as the NDIS wrapper device driver. The NDIS technology is also supported on other systems, such as the Windows95® operating system, in order to support cross platform support of network card device drivers and transport protocol drivers. The integrating component manages all interaction with system level services and hardware to further reduce development complexity of connected drivers. For example, the NDIS wrapper manages initial interrupt processing, system memory allocations to connected drivers, allocation to other hardware resources, etc. as well as providing packet routing capability between network card device drivers and transport protocol drivers.

Referring now to FIG. 3, a logical diagram showing a number of different parts of software for a connection-oriented hardware media that utilizes an integrating component, such as integrating component 36 explained previously, is presented. FIG. 3 represents one way of handling connection-oriented hardware media that utilizes an integrating component but where the connection-oriented device driver must still provide a connection interface and connection management functionality that must be replicated for each and every connection-oriented device driver. In other words, every connection-oriented hardware manufacturer must develop and provide, as part of the device driver, the connection management ability. Furthermore, in many instances an application must be programmed to a proprietary connection interface which further limits the flexibility having an integrating component.

Connection-oriented hardware adapter 52 provides access to a certain media type and is controlled by the connection-oriented device driver 54 as represented by arrow 56. This control includes all the connection creation in management control as well as the packetized network data control that is not associated with the integrating component 58. The connection-oriented device driver 54 communicates with the integrating component 58 as indicated by arrow 60 in the same manner as explained previously in FIG. 2 to provide a data path and to a connection-oriented data transport 62 (as indicated by arrow 64). Finally, the application 66 communicates with the connection-oriented data transport 62, again, as indicated by arrow 68. Note that the arrows used to indicate communication between the various components may in fact indicate communication through additional components. For example, communication may be through an operating system or there may be additional components. FIG. 3 is simplified in order to focus on the two different channels that an application 66 would use to manage connection-oriented hardware.

Arrow 68 may consist of a path of various components in transporting data to and from the data transport 62 that are unimportant for this discussion. For example, the application may communicate with a WinSock communications component that may communicate with yet other components before data arrives at the data transport. All such components are incorporated as part of arrow 68.

Besides the data channel through the data transport 62 in the integrating component 58, the connection-oriented device driver 54 provides a connection channel to the application 66 by means of a connection interface 72 that allows communication between the application 66 and the connection-oriented device driver 54 as indicated by arrow 74. This connection interface 72 can be either proprietary or standardized but in either case must be provided by the connection-oriented device driver 54.

Furthermore, the actual connection management functionality 76 is also included in the connection-oriented device driver 54 thereby increasing significantly in some instances the amount of development for a connection-oriented device driver 54. The connection management functionality 76 includes media-specific control and protocol information for creating and managing a connection over the media by the connection-oriented hardware adapter 52. For example, for Asynchronous Transfer Mode (ATM) media, a certain set of signaling protocols and control information is used, regardless of the actual hardware created by different manufacturers. In other words, each manufacturer must create the same connection management protocol functionality for an ATM card as every other manufacturer. This represents a redundant development effort, particularly when the connection management functionality constitutes a very large portion of the development of the connection-oriented device driver 54 and such connection management functionality is readily defined by adopted standards.

Referring now to FIG. 4, a logical diagram is shown that illustrates the environment in the Microsoft NT operating system. This diagram is equivalent in its functional nature to that shown in FIG. 3 but introduces concepts specific to the NT environment. Note that this is only one example of components used to make and use a connection in a connection-oriented architecture and others do exist.

The application program 78 will be written to communicate with a Win32 communications applications programming interface (API) 80, such as WinSock, as indicated by arrow 82 in order to send and receive data over a connection-oriented data channel with the appropriate connection-oriented transport as has been explained previously. For creating and maintaining a connection, the application 78 may communicate through a Telephony API 84 or TAPI 84 as indicated by arrow 86, or some other interface. Both the telephony API 84 and the Win32 communications API 80 reside in user mode for the NT operating system. Note that elements of the Win32 communications API 80 may be used for creating a connection.

A demarcation between user mode and kernel mode is indicated by dash line 88. Furthermore, there may be additional kernel mode components and/or user mode components that are used to make the communication channels as shown.

Connection-oriented hardware device driver 90 controls the connection-oriented hardware adapter 92 as indicated by arrow 94. For purposes of the data channel, the connection-oriented device driver 90 will communicate bi-directionally with the integrating component 96 as indicated by arrow 98. The data channel is completed by having the integrating component 96 communicate with the connection-oriented data transport 100 as indicated by arrow 102 and further having the data transport 100 communicate with the Win32 API library 80 as indicated by arrow 104. The data channel aspect is relatively known in the art with respect to connectionless device drivers. Because the integrating component 96 incorporates much common functionality common to all network data communications, connectionless device drivers are written in a much simplified fashion.

Again, the connection channel may require substantial effort on the part of the device driver developer. For example, the connection-oriented device driver 90 must provide a connection interface 106 that will communicate with the telephoning API 84 as indicated by arrow 108. Every connection-oriented device driver developer will need to provide such an interface. Furthermore, the connection management functionality 110 that is specific to a particular media upon which the connection-oriented hardware communicates (e.g., ATM, ISDN, etc.) can amount to a substantial amount of development effort. Again, such development effort is duplicate across many developers that essentially implement the same functionality.

When developing device drivers for connection-oriented media devices, such as an ATM or ISDN adapter, a sizable portion of the code is dedicated to making or managing the connection between the origin media device and a destination. Currently, this portion of code must be included in every different media device driver (e.g., every ATM adapter manufacturer must write a device driver having this connection management code). This creates duplicated effort and added expense for device manufacturers.

Because of the added driver development effort required in order to provide connection management facilities, particularly in the case of complex schemes like those found with ATM, it would be desirable to separate the connection management functionality out of the driver so that the connection-oriented device driver development may be simplified. Such simplified connection-oriented device driver development would allow reduced costs, greater efficiency of development resources, and reduced application development efforts.

SUMMARY AND OBJECTS OF THE INVENTION

It is an object of the present invention to remove the burden of having every connection-oriented hardware adapter manufacturer place connection management functionality into the device driver thereby reducing driver development complexity and cost.

It is an object of the present invention to separate the connection creation and management functionality out of a connection-oriented device driver in many instances so that a single connection manager for a given media type, such as ATM, may be provided that will service all hardware adapters of that media type.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and system for separating connection management functionality from a connection-oriented device driver is provided. Note that co-pending U.S. patent application Ser. No. 09/096,690 (filed Jun. 12, 1998) entitled "Method and Computer Program Product for Managing Connection-Oriented Media" is herein incorporated by reference.

An integrating component is enhanced with an abstracted connection interface that can be used to make and manage underlying connections without the interface user necessarily knowing the details regarding the making of the connection. The interface will allow a client of the integrating component to make connections and register service access points so that the client will receive notification of incoming calls and can thereafter make connections with the calling location.

The present invention reduces the amount of coding effort required by a connection-oriented driver developer. This is done by providing a connection manager component that can be "inserted" into the driver subsystem. The driver subsystem includes an integrating component that allows device drivers to be simplified that also has an interface to receive the connection manager component. When the same call management protocol is used across a particular media type, such as ATM, a single connection manager component can be used for all adapters and device drivers of a given media type. In this manner, the device manufacturers would not have to develop the connection manager component if already supplied by another party or could develop a single connection manager module across a number of different adapters.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5 is a block diagram of an exemplary system for implementing the present invention that includes a general purpose computing device in the form of a conventional personal computer;

DETAILED DESCRIPTION OF THE PREFERRED EMBODIMENTS

Figure 1:
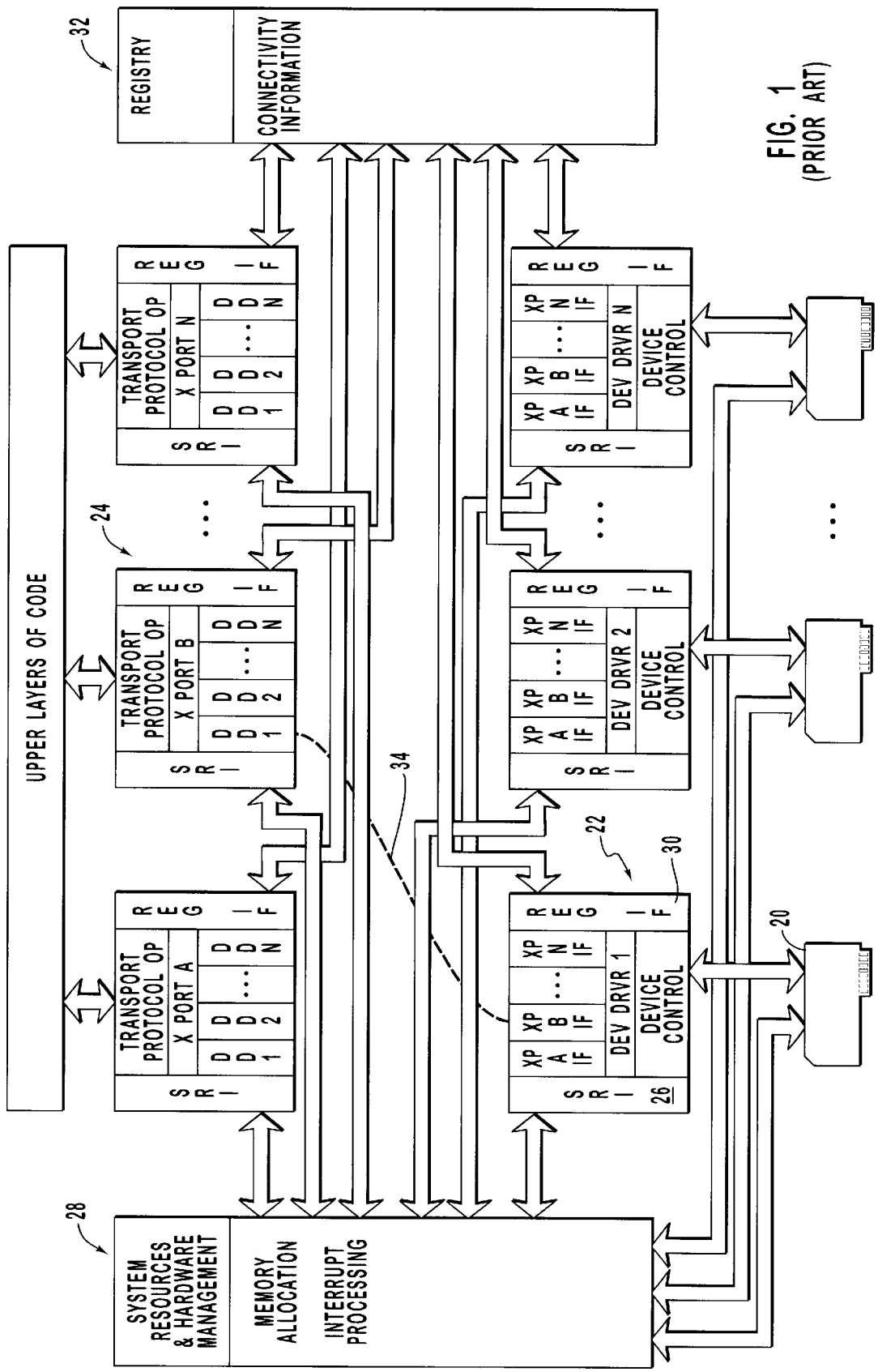
FIG. 1 is a block diagram showing the environment and interfacing of network card device drivers and transport protocol drivers as existing in the prior art.
Figure 2:
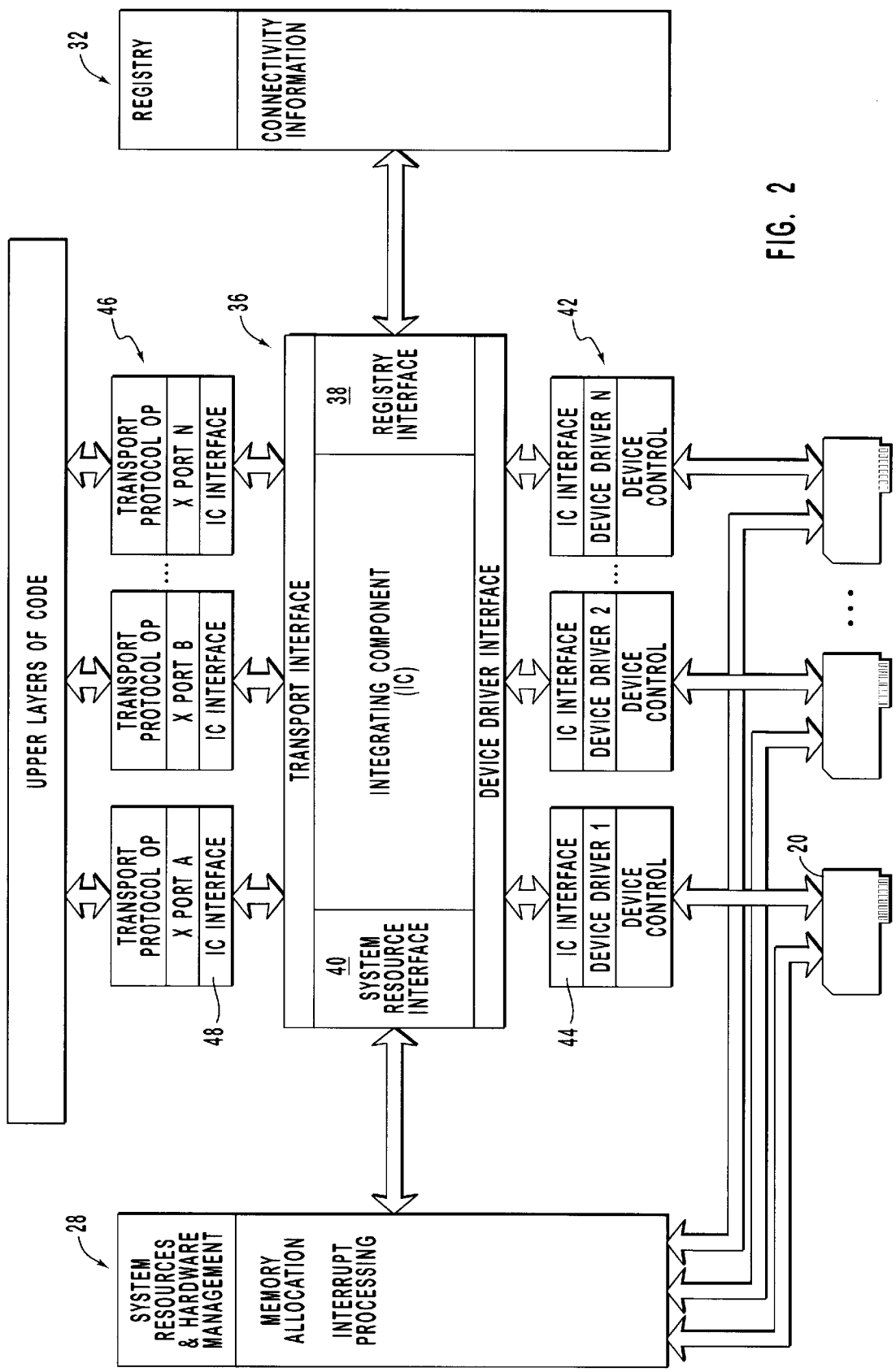
FIG. 2 is a block diagram showing the introduction of an integrating component that reduces the development complexity of network card device drivers and transport protocol drivers that constitutes the current environment of the present invention.
Figure 4:
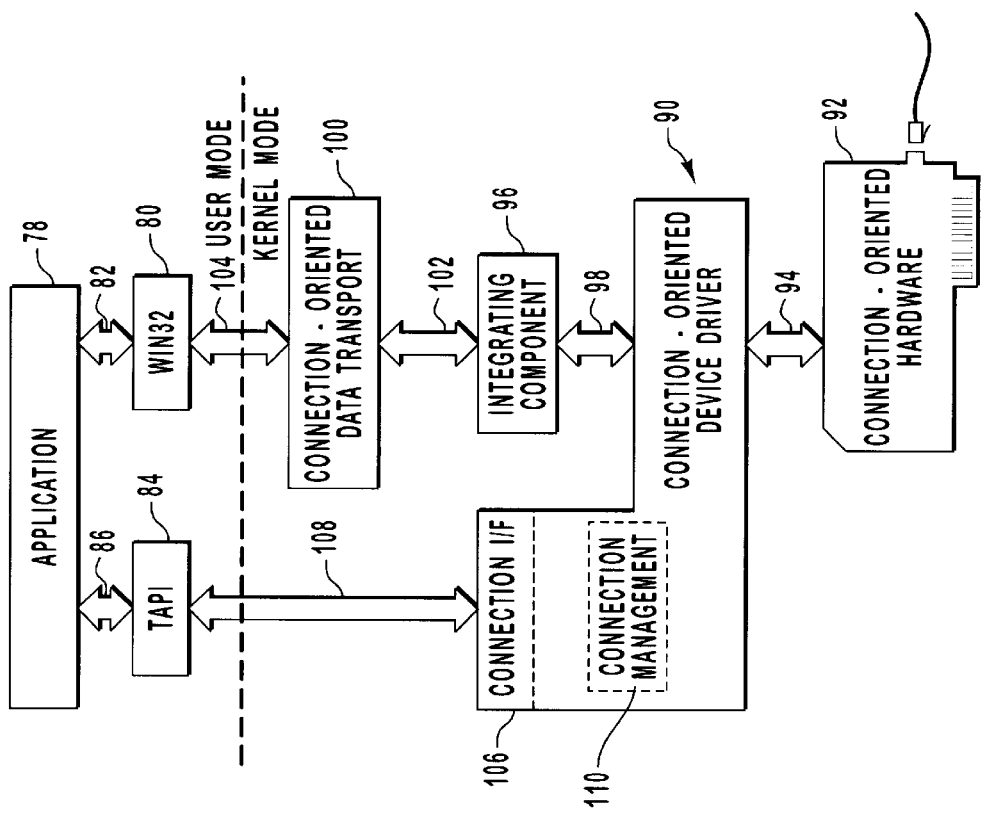
FIG. 4 is a more specific block diagram functionally equivalent to that of FIG. 3 wherein specific elements of the NT operating environment are introduced.

As used herein, the term "software component" refers to any set of executable instructions separately cognisable to an operating system that manages a computer system. Examples would include separate processes or threads, application programs, system device drivers, and any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another. The physical network may also be referred to as a specific "media" wherein different media types require different hardware adapters. Furthermore, "signaling protocols" are used to communicate on a particular media type for creation and management of a connection.

As used herein, the term "driver" refers to software driver programs running in a privileged system environment and that interacts with an I/O subsystem as part of an operating system architecture. Such drivers are distinguishable from application programs and other software. A simplified connection-oriented device driver or driver refers to a driver that is smaller in size, less complex, easier to make, or otherwise benefitted over an ordinary driver due to the advantages disclosed herein.

As used herein, the term "direct call linkage" refers to a function call interface. The actual address resolution may be done at compile time through traditional linkers or may be done dynamically by system components when using such entities as dynamic link libraries or export libraries. An invocation session is created when a subroutine is initially called and ends when that particular subroutine ends. An Application Programming Interface (API) is a set of subroutines provided by one software component so that relevant services may be uniformly accessed. The term "interface" as used in connection with a presently preferred embodiment of the present invention is a direct call linkage between different subroutines provided by the different components. These are typically centered around the integrating component that will provide a number of programming interfaces (e.g., connection interface, connection-oriented data transport interface, etc.) that other components may directly call. Furthermore, as part of these interfaces, a component may be required to provide entry points into subroutines that it will provide so that execution flow may pass from one entity to the other.

As used herein, the term "messaging" refers to sending uniform message blocks between software components in order to communicate therebetween. One example would be the I/O Request Packet (IRP) structure used in the Windows NT I/O system to communicate between different drivers.

FIG. 5 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to removable optical disk 131 such as a CD ROM or other optical media. The hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. Furthermore, computer readable media includes, but is not limited to, carrier waves over wire or wireless having a data signal embodied therein that represents instructions for use by the computer.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus 123, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 5. The logical connections depicted in FIG. 5 include a local area network (LAN) 151 and a wide area network (WAN) 152. Such networking environments are commonplace in offices enterprise-wide computer networks, intranets and the Internet. Furthermore, computer readable instructions may be transmitted over such networking environments such that they represent another form of computer readable media.

When used in a LAN networking environment, the personal computer 120 is connected to the local network 151 through a network or adapter 153. When used in a WAN networking environment, the personal computer 120 typically includes a modem 154 or other means, such as an ATM adapter, for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figure 3:
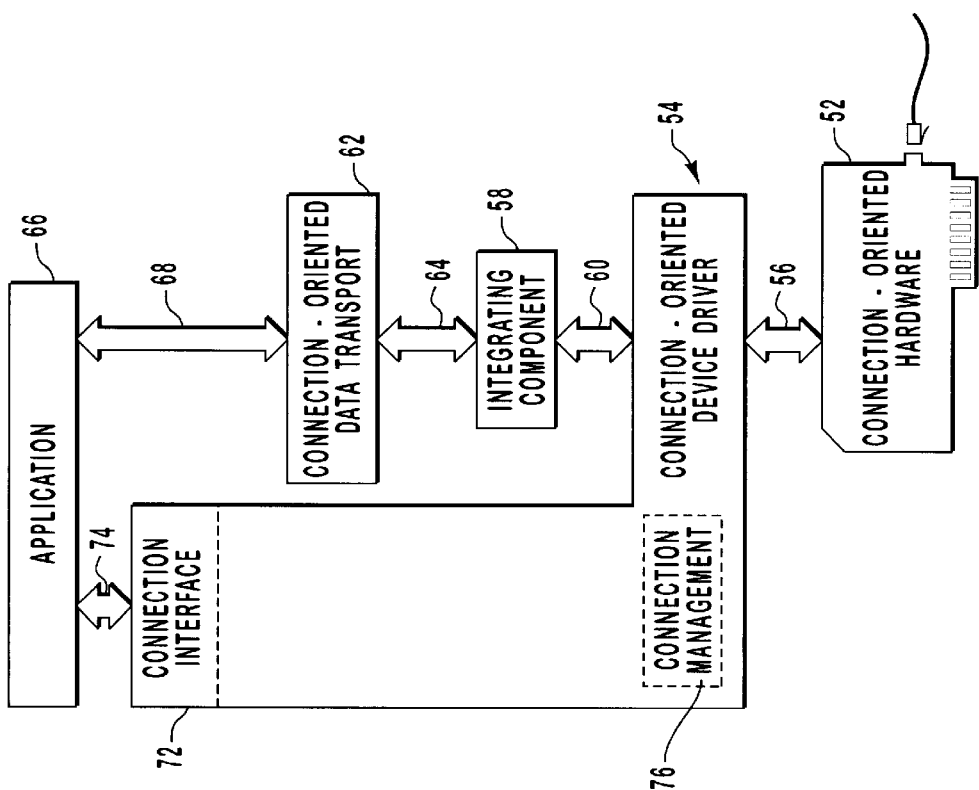
FIG. 3 is a general block diagram showing connection-oriented hardware with accompanying connection-oriented device driver as it fits into the scheme shown in FIG. 2.
Figure 6:
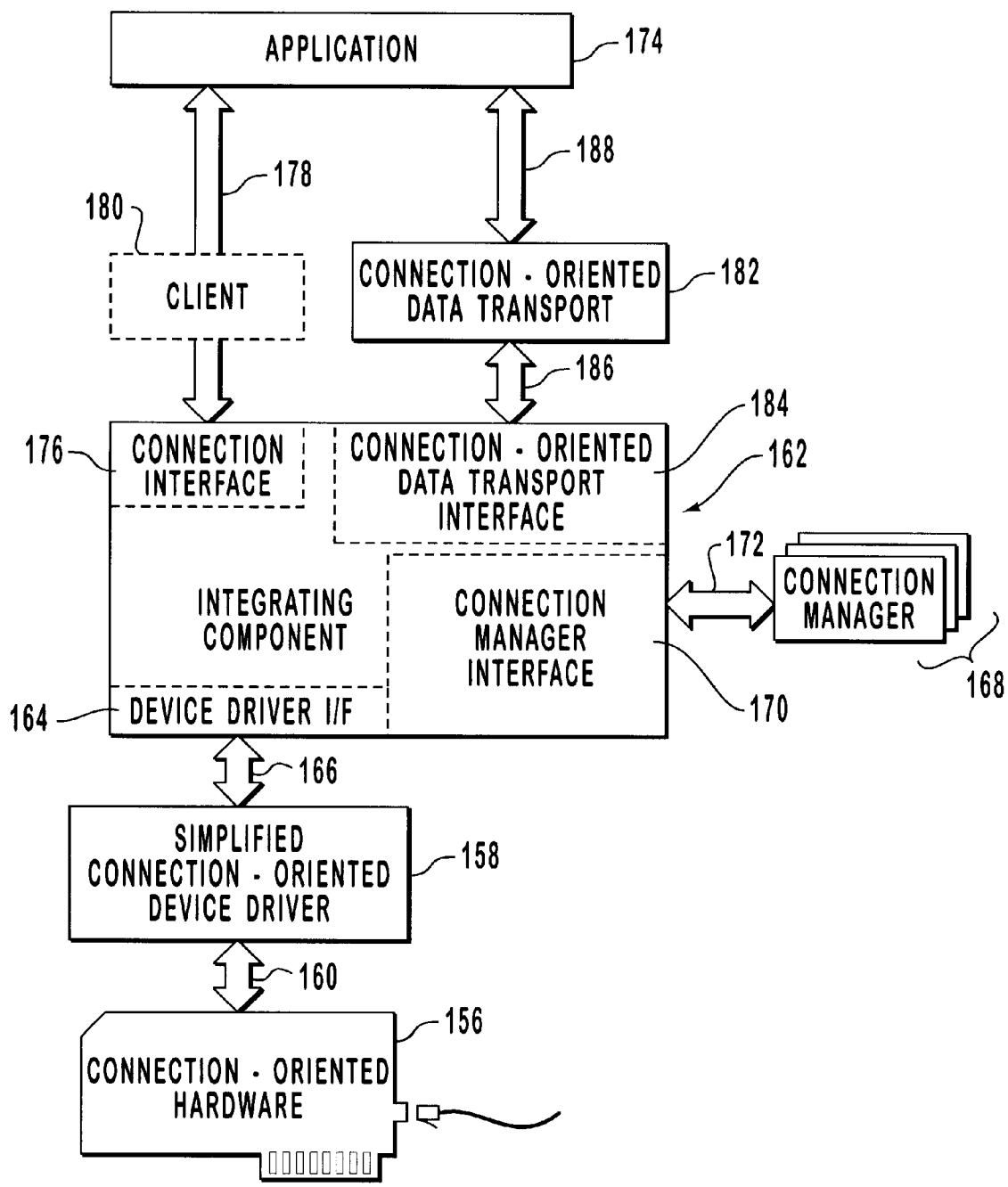
FIG. 6 is a block diagram showing an enhanced integrating component according to the present invention corresponding to FIG. 3 and having a connection manager component separate from the device driver.

Referring now to FIG. 6, a logical diagram presenting an integrating component that provides an abstracted connection interface and an additional connection manager component according to the present invention is shown. FIG. 6 corresponds functionally in many respects as FIG. 3 with an important benefit being that the connection-oriented device driver may be written in more simplified fashion. In other words, the connection management ability is handled by the connection manager component and not the device driver. Furthermore, the connection interface with upper layers of code is standardized at the integrating component relieving this additional burden from the device driver as well.

The connection-oriented hardware adapter 156 provides access to a particular connection-oriented media. For example, the connection-oriented hardware adapter 156 may be an ATM adapter that will allow connection onto an ATM network. Other kinds of connection-oriented communications networks include Integrated Services Data Network (ISDN), Plain Old Telephone Service (POTS), etc.

The connection-oriented hardware adapter 156 is controlled and managed by a simplified connection-oriented device driver 158 as indicated by the arrow 160. This simplified connection-oriented device driver will require less effort to develop since connection management capability has been removed from the device driver and it will no longer have to provide a connection interface. The integrating component 162 has been enhanced by providing an abstracted connection interface and a call management interface that will be explained hereafter. As before, the simplified connection-oriented device driver 158 will interact with the integrating component 162 through the device driver interface 164 as indicated by arrow 166. The simplified connection-oriented device driver 158 will be written to a standardized device driver interface 164 that will allow all necessary connection functions to be carried out by the device driver as part of controlling the underlying hardware.

A plurality of connection manager components or connection managers 168 will also interact with the integrating component 162 over a connection management interface 170 as indicated by the arrow 172. A connection manager may be developed independently of the simplified connection-oriented device driver 158 so that a common connection manager may be used with a variety of different device drivers 158. This would allow the provider of the integrating component 162 to also provide one or more connection managers as part of the plurality of connection managers 168 so that a manufacturer of a connection-oriented hardware adapter 156 need only provide the simplified connection-oriented device driver 158 and need not be concerned about providing connection functionality nor a separate connection interface as part of the device driver code.

Each connection manager of the plurality of connection managers 168 is capable of supporting or providing one or more address families. As used herein, the term "address families" refer to signaling protocols used to make and manage connections on a particular media type. These signaling protocols will be used to control an adapter as well as communicate across the specific media type in order to create and maintain connections.

In some instances, a connection manager may support multiple address families. For example, on an ATM network an address family for the Q2931 protocol may be supported for a 3.1 version or a newer 4.0 version. The corresponding connection manager could provide either or both of these address families to be made available to clients. In this manner, a legacy client that is unaware of the newer signaling protocol version may compatibly bind with the older version. The connection interface provided by the integrating component will allow a client to query the different address families that are registered by a connection manager so that the client may choose an address family that is known to the client.

An application 174 will eventually communicate with the integrating component 162 for connection purposes through the connection interface 176 as indicated by arrow 178. Arrow 178 may represent a number of different protocols and components in order to make and manage such connection depending on the configuration of the system and what protocols are installed. In any case, direct communication with the integrating component is done through a client 180 that is shown in outline form in FIG. 6. The client is any component that directly interacts with the integrating component over the connection interface 176 regardless of what other functions the client may perform. In other words with respect to the connection interface 176 anything, whether it be the application itself 174 or some other component, such as a data transport protocol, device driver, etc., will be considered the client 180 and will operate in the same manner over the connection interface 176.

With respect to actually sending data over a created connection, a connection-oriented transport 182 may be used to communicate with the connection-oriented data transport interface as indicated by arrow 186. Such a connection-oriented data transport 182 would indicate a particular connection by reference to a connection identifier that identifies the particular connection over which data may be transported. Further, the connection-oriented data transport 182 will communicate with an application program 174 as indicated by the arrow 188. Again, the arrow 188 may represent a number of different components in order to make the communication between the application and the connection-oriented data transport 182.

Note that the integrating component 162 with its connection interface 176 and the connection-oriented data transport interface 184 may have a single client that will operate both interfaces. Furthermore, a connectionless data transport interface (not shown) may also make up part of the integrating component 162 as explained previously. The logical diagram in FIG. 6 is simplified in order to present the aspects of the present invention and those skilled in the art will quickly observe that many other different kinds of functionality may be incorporated into the integrating component 162.

Figure 7:
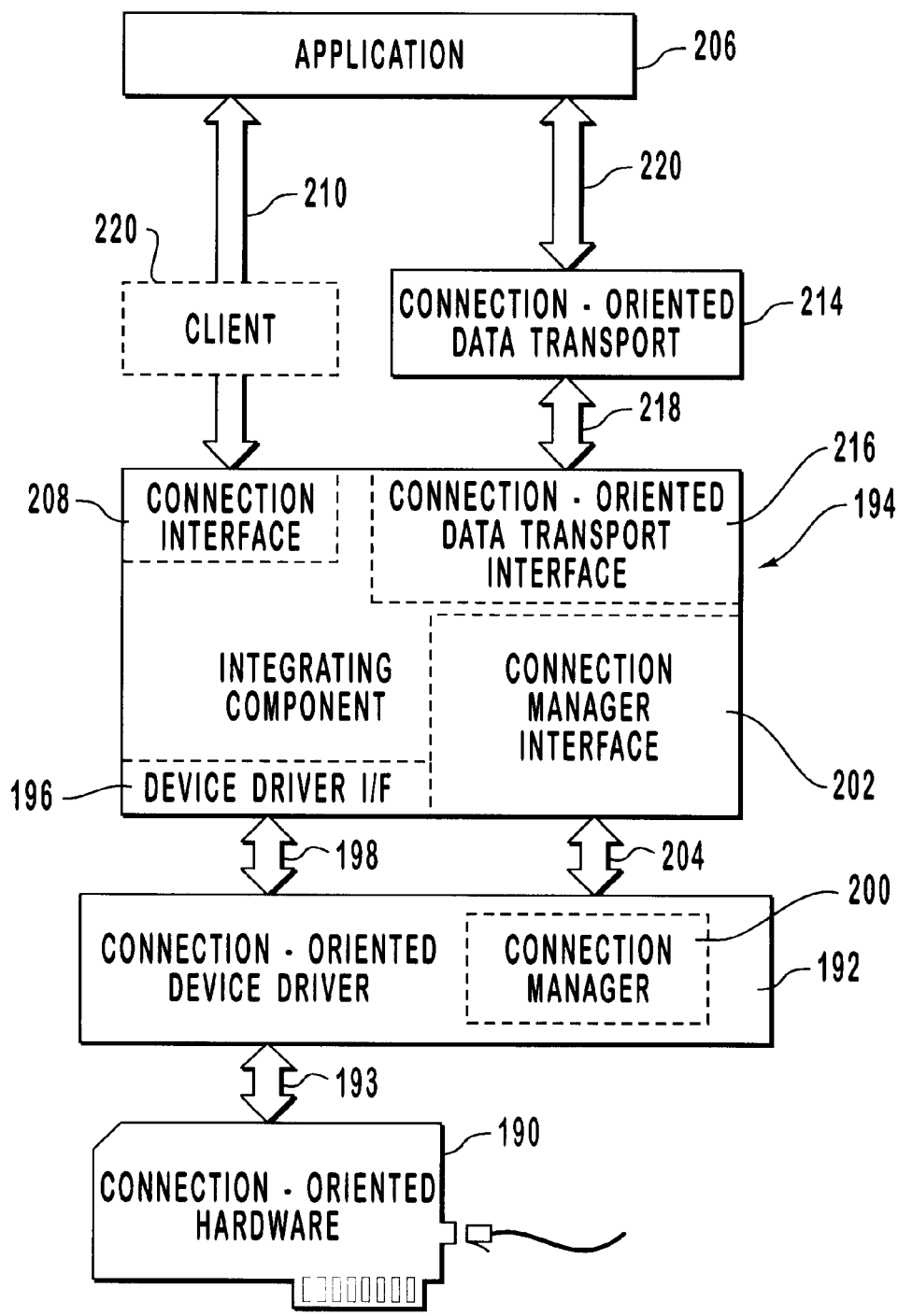
FIG. 7 is a block diagram showing an enhanced integrating component according to the present invention corresponding to FIG. 3 wherein the connection management functionality is contained within the device driver but uses the same connection manager interface of the integrating component.

Referring now to FIG. 7, a logical diagram presenting an integrating component that provides an abstracted connection interface and connection manager interface according to the present invention is shown. FIG. 7 corresponds functionally in many respects as FIG. 3 with an important benefit being that the connection interface is abstracted from the details of how the connection is provided by a particular media type. The device driver is relieved from providing an interface and will provide the connection functionality through the connection manager interface, also provided by the integrating component.

Note that the connection management interface is substantially the same in both FIG. 6 and FIG. 7 with only minor differences in order to determine whether the connection management functionality is included as part of the device driver or is an entirely separate component. In either case, the connection management will occur in the same manner as explained hereafter.

The connection-oriented hardware adapter 190 provides access to a particular connection-oriented media. For example, the connection-oriented hardware adapter 190 may be an ATM adapter that will allow connection onto an ATM network. Other kinds of connection-oriented communications networks include Integrated Services Data Network (ISDN), Plain Old Telephone Service (POTS), etc.

The connection-oriented hardware adapter 190 is controlled and managed by a connection-oriented device driver 192 as indicated by the arrow 193. This connection-oriented device driver will require less effort to develop since it will no longer have to provide a connection interface. The integrating component 194 has been enhanced by providing an abstracted connection interface and a call management interface that will be explained hereafter. As before, the connection-oriented device driver 190 will interact with the integrating component 194 through the device driver interface 196 as indicated by arrow 198. The connection-oriented device driver 190 will be written to the standardized device driver interface 196 that will allow all necessary connection functions requiring hardware control to be carried out by the device driver as part of controlling the underlying hardware.

A connection manager portion 200 of the connection-oriented device driver 192 will also interact with the integrating component 194 over a connection management interface 202 as indicated by the arrow 204.

The connection manager portion 200 of the connection-oriented device driver 192 is capable of supporting or providing one or more address families. As explained previously, the term "address families" refer to signaling protocols used to make and manage connections on a particular media type. These signaling protocols will be used to control an adapter as well as communicate across the specific media type in order to create and maintain connections.

In some instances, a connection manager may support multiple address families. For example, on an ATM network an address family for the Q2931 protocol may be supported for a 3.1 version or a newer 4.0 version. The corresponding connection manager could provide either or both of these address families to be made available to clients. In this manner, a legacy client that is unaware of the newer signaling protocol version may compatibly bind with the older version. The connection interface provided by the integrating component will allow a client to query the different address families that are registered by a connection manager so that the client may choose an address family that is known to the client.

An application 206 will eventually communicate with the integrating component 194 for connection purposes through the connection interface 208 as indicated by arrow 210. Arrow 210 may represent a number of different protocols and components in order to make and manage such connection depending on the configuration of the system and what protocols are installed. In any case, direct communication with the integrating component is done through a client 212 that is shown in outline form in FIG. 7. The client is any component that directly interacts with the integrating component over the connection interface 208 regardless of what other functions the client may perform. In other words with respect to the connection interface 208 anything, whether it be the application itself 206 or some other component, such as a data transport protocol, device driver, etc., will be considered the client 212 and will operate in the same manner over the connection interface 208.

With respect to actually sending data over a created connection, a connection-oriented transport 214 may be used to communicate with the connection-oriented data transport interface as indicated by arrow 218. Such a connection-oriented data transport 214 would indicate a particular connection by reference to a connection identifier that identifies the particular connection over which data may be transported. Further, the connection-oriented data transport 214 will communicate with an application program 206 as indicated by the arrow 220. Again, the arrow 220 may represent a number of different components in order to make the communication between the application and the connection-oriented data transport 214.

Note that the integrating component 194 with its connection interface 208 and the connection-oriented data transport interface 216 may have a single client that will operate both interfaces. Furthermore, a connectionless data transport interface (not shown) may also make up part of the integrating component 194 as explained previously. The logical diagram in FIG. 7 is simplified in order to present the aspects of the present invention and those skilled in the art will quickly observe that many other different kinds of functionality may be incorporated into the integrating component 194.

Figure 8:
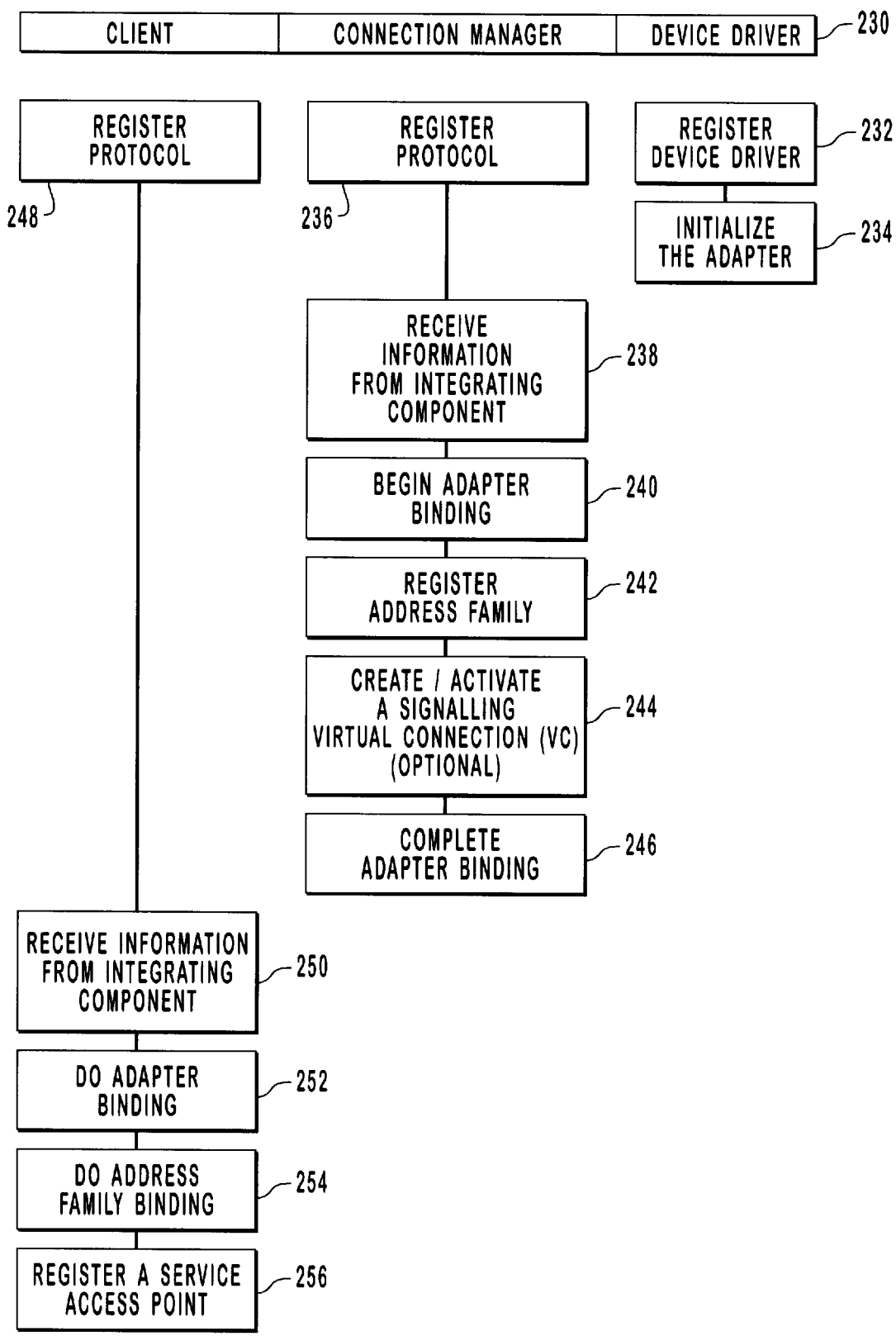
FIG. 8 is a flow chart showing the processing steps for initialization of the various components shown in FIG. 6.

Referring now to FIG. 8, a flow chart showing the processing steps for binding and initialization of the different components is shown. As used herein, the term "binding" refers to the process of making a logical association between different components. Furthermore, components that are "bound" together may form a data channel or a connection control channel. The bar 230 lists each of the different components other than the integrating component and the corresponding steps below the titled component indicates steps pertinent to that respective component.

With respects to the connection-oriented device driver, such as the connection-oriented device driver 158 of FIG. 6, the device driver code will register the device driver with the integrating component at step 232. This registration process is designed to make the integrating component aware of the device driver and its various capabilities and settings. Furthermore, certain entry points into the device driver code will also be made known to the integrating component so that execution flow and control may be passed from the integrating component to the device driver by a simple function call mechanism. In this manner, certain entry points, called handler functions, are registered with the integrating component. Other components will communicate with the integrating component by calling defined functions of the integrating component API. An "interface" on the integrating component comprises the API subroutines that will be called for the interface functionality as well as the provided handlers by the different components. Those skilled in the art will note that other mechanisms, such as message passing or packet passing may also be used to communicate between the different components.

At step 234, the device driver code will initialize the adapter and take all necessary steps in order to have the adapter and the device driver ready for making or receiving connections and otherwise operating the adapter to send data over the particular media type.

At step 236, the connection manager will register itself as a protocol with the integrating component. Components that are registered with the integrating component that are not device drivers are considered protocol drivers and would include components such as the connection manager, a client of the integrating component for making connections or transmitting data, or a data transport protocol driver (whether connection-oriented or connectionless), etc. At step 238, the connection manager will receive information from the integrating component regarding available adapters, their media type, and connectivity information. Such information may be queried, received from the integrating component, accessed from the registry, etc. according to the particular implementation.

Binding by the connection manager with the various adapters begins at step 240. At this point, the connection manager will designate the various adapters to which it will bind or to which it otherwise pertains. For example, an ATM connection manager would designate the appropriate ATM hardware adapters and select them for binding. Further resource may be made to the registry information in making this determination or it may be done automatically without explicit configuration on the part of a user. Those skilled in the art will recognize that a number of different options may be used to accomplish an appropriate binding.

The address family or families that the connection manager supports for a particular adapter is registered with the integrating component at step 242. The address family indicates the media type and signaling protocol that a particular connection manager will support. An address family will be used by a client for making and using a connection over the particular media type. For example, for an ATM connection manager the address family would be related to Q2931 standard. Such address families will be available to various clients who will "open" an address family in order to make the binding or association between the client and the connection manager complete.

Separately, the connection manager and the client will also bind or associate with the particular hardware connection-oriented adapter and corresponding device driver for a particular media type. In this manner, a three-way association between the various parts (i.e., client, connection manager, and device driver) are made through the integrating component. The integrating component will also maintain many of the common data structures used by the different I/O subsystem parts.

An optional step 244 may be taken for creating a virtual connection depending upon media type. A virtual connection that is not associated with an actual connection between clients would be used by the connection manager for interacting with the device drive controlling the connection-oriented hardware adapter. For example, ATM adapters may require such a "private" virtual connection in order to asses quality of service availability on the ATM network.

Finally, the connection manger registration and initialization is completed when at step 246 the binding with the adapters is completed. The integrating component will match such address family registration information with the parameters supplied by a client when attempting to "open" an address family so that the association or binding may be made correctly.

With respect to the client, it will register itself as a protocol at step 248 so that the integrating component knows of its existence, capabilities, and various entry points in order to operate with the established interfaces. A client may use a number of different integrating component interfaces in order to accomplish its desired function. For example, the client may operate with solely the connection interface in order to make connections and pass identifiers created connections to an application or some other layer further up the protocol stack for use in data transmission over the connection. Alternatively, a client may both make the connection as well as send data over the connection-oriented data transport interface using the connection identifier previously received. Depending on other interfaces provided by the integrating component, such as a connectionless interface, any client may interface thereto in addition to the connection interface.

At step 250, a new client will receive integrating component status information from the integrating component in some fashion, whether by a data structure parameter into an entry point or querying or other communication mechanism known in the art. With this information, the client will do an adapter binding at step 252 in order to make a binding or an association with the correct hardware media adapter and corresponding device driver. In this fashion, both the connection manager and the client have been bound or associated with the same adapter/device driver. Next, at step 254, the client will "open" an address family or otherwise make the association or binding between the client and the connection manager. Again, this is done is done using the API calls pertinent to the connection interface provided by the integrating component in one embodiment of the present invention. As explained previously, those skilled in the art will note that other forms are known for communicating between components and integrating component such as messaging, etc.

Finally, at step 256, the client will register a service access point in order to receive notification of incoming calls destined to be made into connections. When a service access point is registered, a particular connection manager will receive the incoming call and will dispatch it to the client having the appropriate service access point registered so that the actual connection may be made as will be explained in more detail hereafter.

Figure 9:
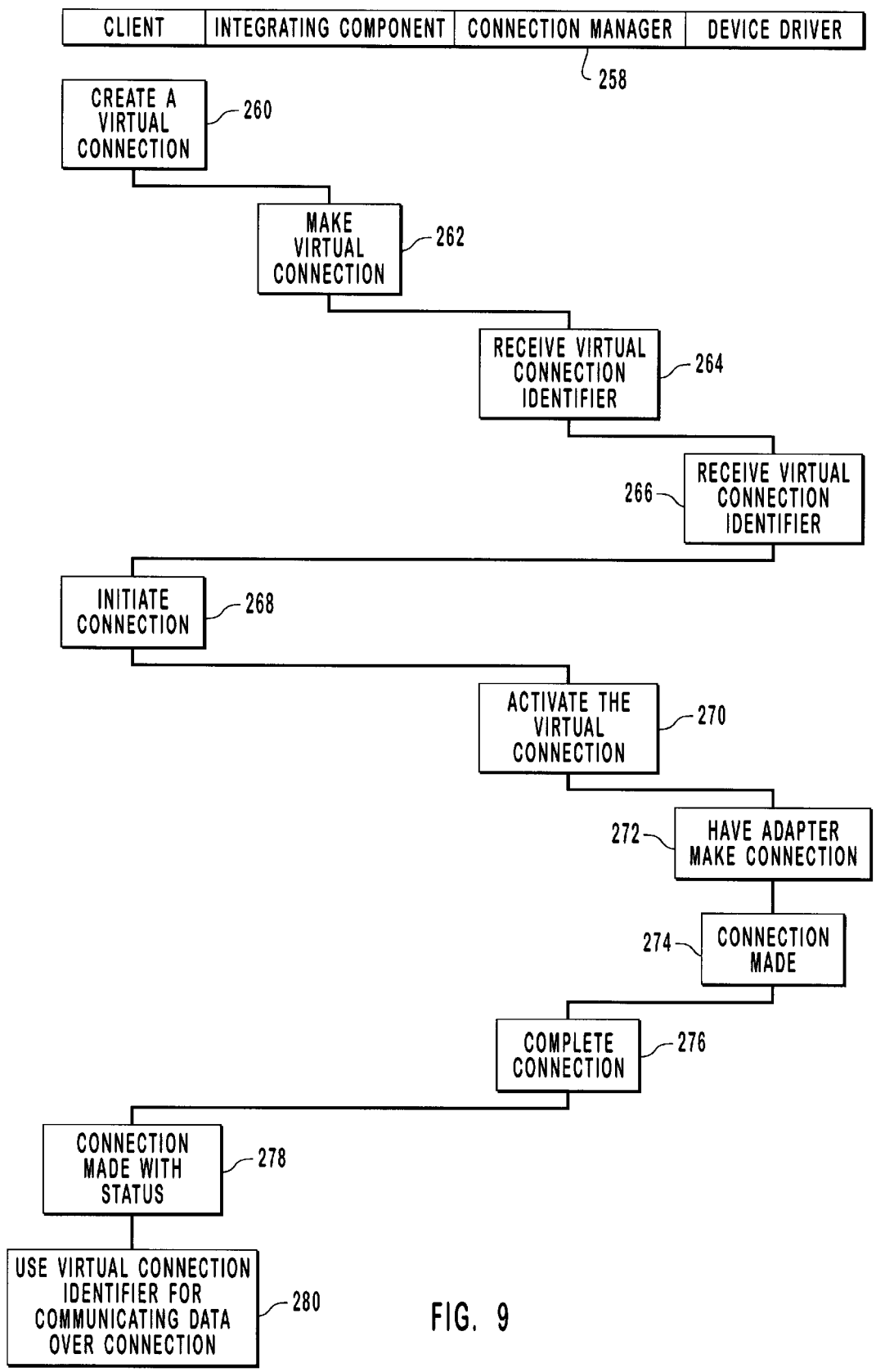
FIG. 9 is a flow chart showing the processing steps taken by the different components of FIG. 6 in order make an outgoing call or connection so that data may be transmitted over the connection through a data channel.

Referring now to FIG. 9, a flow chart showing the processing steps taken by the various components in order to create a connection over a particular media type is shown. Note that these steps are taken only to make the connection and prepare the system for sending or receiving data over the previously connection. Data transmission may be done by the client or the connection identifier may be passed to a different component client to the integrating component.

The bar 258 over FIG. 9 indicates the different components shown in FIG. 6 that may be operating at any given point in time. The processing steps indicated below the signified component (e.g., client, integrating component connection manager, or device driver) will be where the designated functionality is actually performed. Transitions between the different components may occur in a variety of manners and by making function calls through the integrating component. Note also that in almost every instance, communication will occur through the integrating component though not necessarily shown. For example, going from step 264 to step 266 occurs between the connection manager and the device driver as shown in FIG. 9, but the actual flow of execution will have passed through the integrating component. This is done in order to focus on the functional elements performed by the differing components.

When a client desires to make a connection to a destination node, it will begin the process of creating a virtual connection at step 260. A virtual connection is first created and then activated. Furthermore, since a virtual connection may be created by either a client (for outgoing calls or connections) or a connection manager (for receiving calls or connections) only the entity that created the virtual connection may later destroy the virtual connection. This rule is enforced by the integrating component which will actually perform the allocation of the data structures and track the status of the virtual connection.

At step 262, the integrating component will actually make the virtual connection data structure and an identifier for that virtual connection will be received by the connection manager at step 264 so that appropriate connection manager processing may occur. Next, the identifier for the virtual connection will be received by the connection-oriented device driver at step 266 so that device driver may also perform appropriate connection processing. In one preferred embodiment, the reception of the identifier is received by having the integrating component call a "handler" routine whose entry point had been previously provided during the registration step for the respective component (e.g. connection manager, device driver).

At step 268, execution control will be back to the client where the client will initiate the connection using the virtual connection identifier received from the integrating component that represents the virtual connection. The connection manager will then activate the virtual connection at step 270 by issuing the appropriate commands to the device driver. At this point, the device driver will have the adapter make the connection at step 272 and receive a connection made indication at step 274. Completion of the connection is then indicated at step 276 for the connection manager which in turn indicates through the integrating component to the client that connection was made.

At step 278, the client receive notification of the connection being made with status information and a virtual connection identifier that may be used in order to communicate over the connection. Finally, the client may begin data transmission and received over the virtual connection using the virtual connection identifier and the connection-oriented interface of the integrating component. In other words, the connection-oriented data transport interface subroutine calls or other communication mechanism will require the virtual connection identifier as part of the parameter list so that the correct connection will be used in a system having many simultaneous virtual circuits in operation. Additionally, for some media types, such as ATM, many different virtual connections may be made simultaneously over the same hardware and having a virtual connection identifier allows each individual connection to be separately used and be logically separated.

Figure 10:
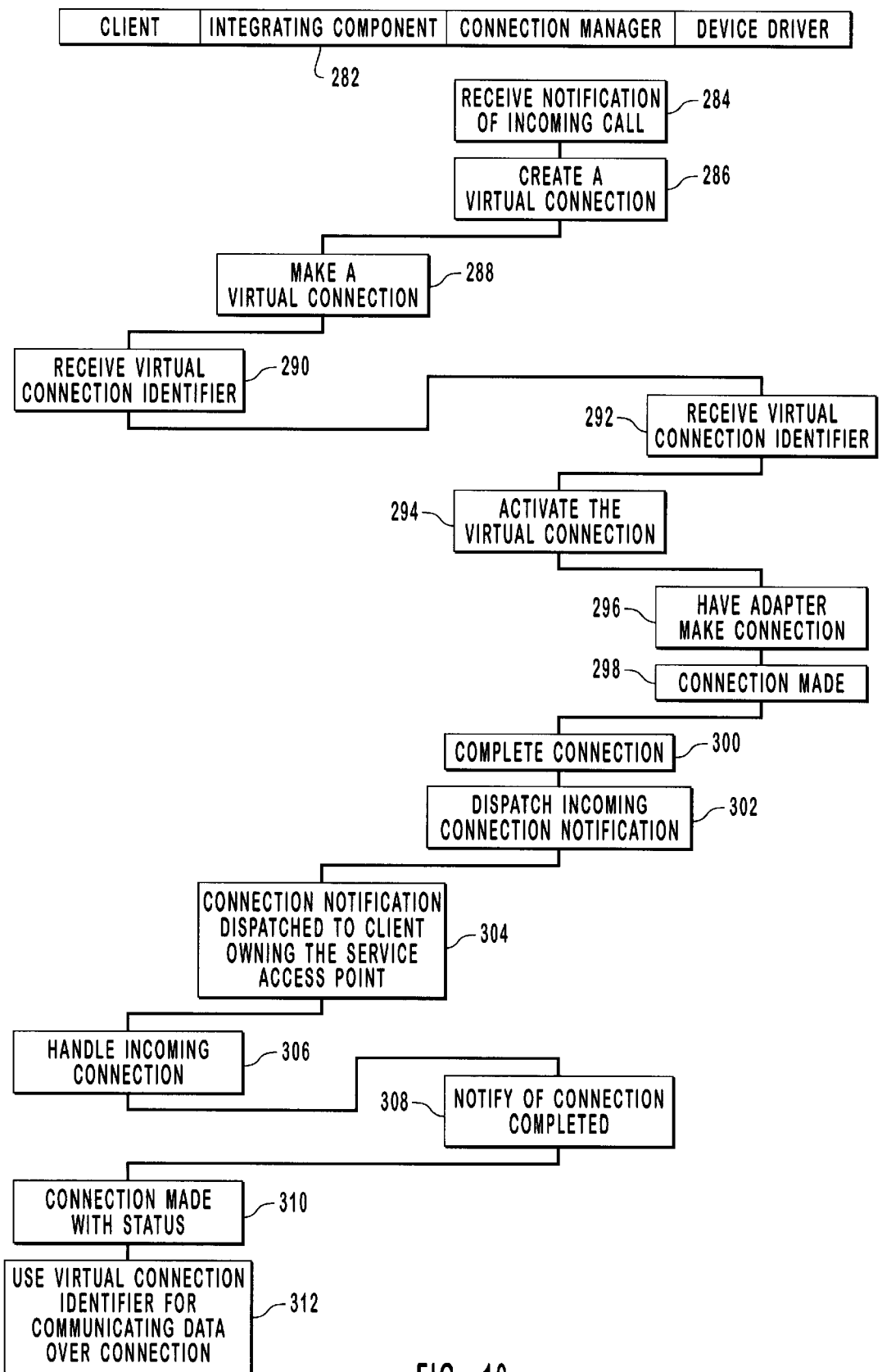
FIG. 10 is a flow chart showing the processing steps taken by the components shown in FIG. 6 for receiving an incoming call or connection and processing the same.
Figure 11:
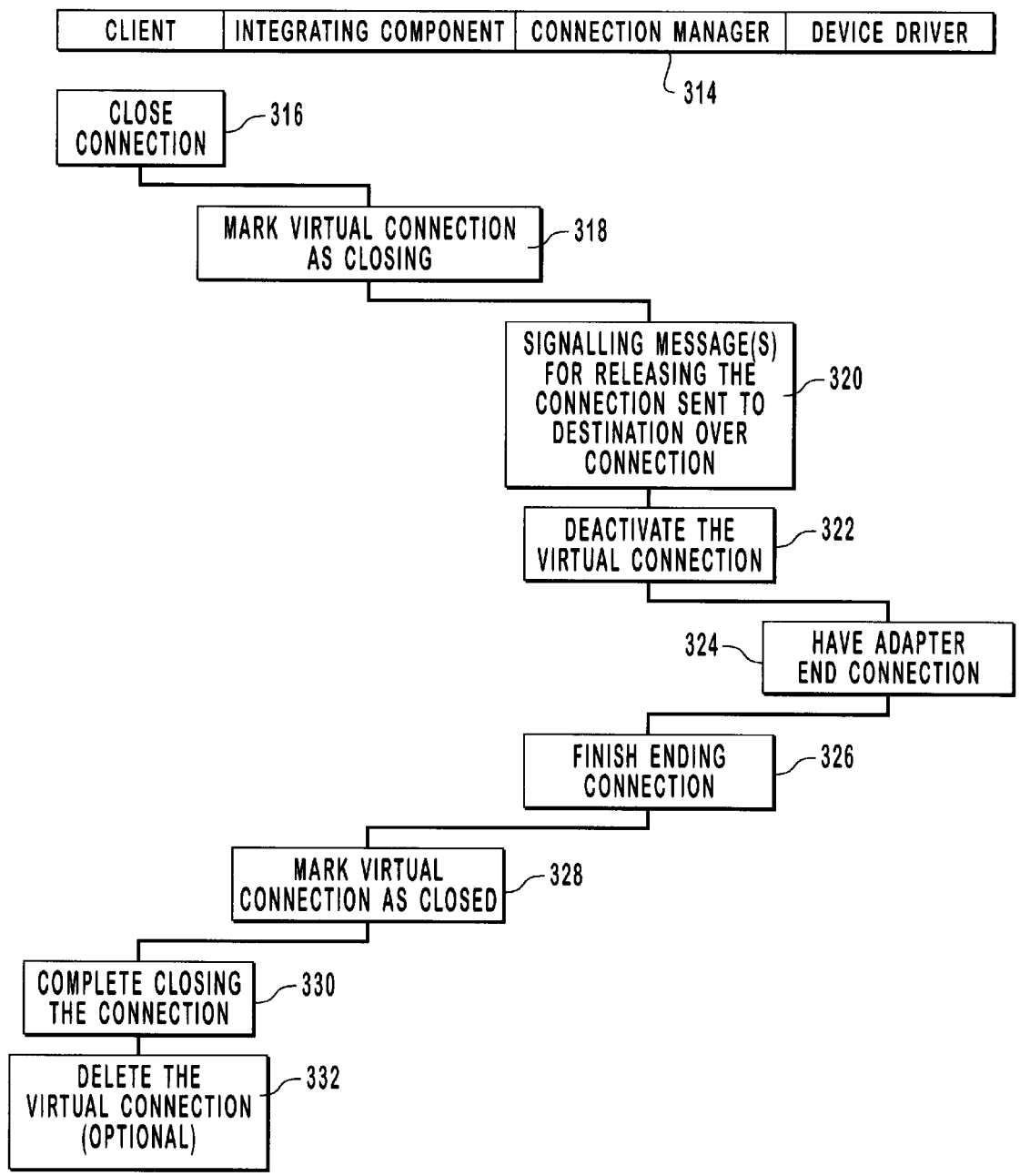
FIG. 11 is a flow chart showing the processing steps taken by the components in FIG. 6 wherein a client closes an existing connection as would occur when a client closes a connection that it had previously made.

Referring now to FIG. 10, a flow chart showing the processing steps performed by the various system components that occur when receiving notification of an incoming call in order to make a connection and to begin communication over that connection is shown. Again, the bar 282 indicating which of the various components has control or performs each processing step is shown above the respective steps.

Initially, processing begins with the connection manager receiving notification of an incoming call at step 284. This notification will be transmitted from the hardware and device driver as they interact together as well as further interaction with the integrating component and operating system.

A virtual connection is created by the connection manager at step 286. This is done through a function call invocation to the integrating component which receives control and actually makes the virtual connection at step 288. The integrating component will create the data structures associated with the virtual connection and manage the logical lifetime of the virtual connection.

Existence of the virtual connection and it's identifier is next transmitted to both the client at step 290 and to the device driver at step 292 from the integrating component. In other words, both the client and the device driver will receive notification of the virtual connection creation and the virtual connection identifier and will do all associated initial processing. This results in a valid virtual connection created with all the active parties to the connection (ibe., client, connection manager, and device driver) having the identifier and having done all initial processing.

Next, at step 294, the connection manager will activate the virtual connection in order to receive the incoming call or connection. This is done by having the media adapter make the connection at step 296 over the media.

The device driver will receive notification that the connection has been made at 298 before turning control back to the connection manager at step 300 where the virtual connection will be completed at step 300. Next, the notification of the incoming and completed connection will be dispatched to the client for handling at step 302. This is done by communicating this to the integrating component which will dispatch the connection notification to the appropriate client based on ownership of a previously registered service access point. The connection characteristics will be matched with a group of registered service access points at the integrating component in order to determine which client should receive the connection. Finally, the client will handle the incoming connection at step 306 and make whatever housekeeping calls are necessary to recognize the incoming connection.

The connection manager will then receive notification that the connection is complete at step 308, meaning that the client is aware of the connection and waiting for final status. The connection manager will make the completion of the connection in preparation for use by the client of step 308 before control is passed to the client.

At step 310, the client receives notification that the connection is made with status regarding that connection that includes but is not limited to the virtual connection identifier and status that the connection is made and ready to receive data. This virtual connection identifier is used for communicating over the connection at step 312 whether to receive data or to send data. Note also that the client may pass the virtual connection identifier to another software component that may in turn use it for communicating over the connection-oriented data transport interface of the integrating component. In either case, the connection is ready to handle data.

Referring now to FIG. 1, a flow chart showing the processing steps for ending a connection as initiated by a client is shown. The bar 314 has listed therein the different system components and below each component name would be the processing steps performed by that respective component.

The client begins at step 316 by closing the connection by issuing the appropriate integrating component subroutine call. The integrating component will take processing control at step 318 and mark the identified virtual connection as closing and pass control to the connection manager.

At step 320, the connection manager will communicate over the connection signaling messages for releasing the connection. These messages are sent to the destination node of the connection so that the connection may be terminated at that end as well.

At step 322, the connection manager will deactivate the virtual connection so that it no longer is in use. Control passes to the device driver, where at step 324 the device driver will instruct the adapter to physically end the connection over the media. Next, control flows back to the connection manager where the connection completion is finished as far as the connection manager is concerned at step 326.

Control then passes to the integrating component where the virtual connection is marked as closed at step 328. The virtual connection will remain in existence until explicitly deleted but will be closed until activated at some future point in time.

Finally, the client receives notification at step 330 that the connection has been closed and completes any necessary cleanup to finish the closing of the connection. A virtual connection may be deleted at step 332 if necessary or desirable. Step 332 is optional since it may also be desirable to leave the connection in existence so that it may be activated and used at a later time.

Figure 12:
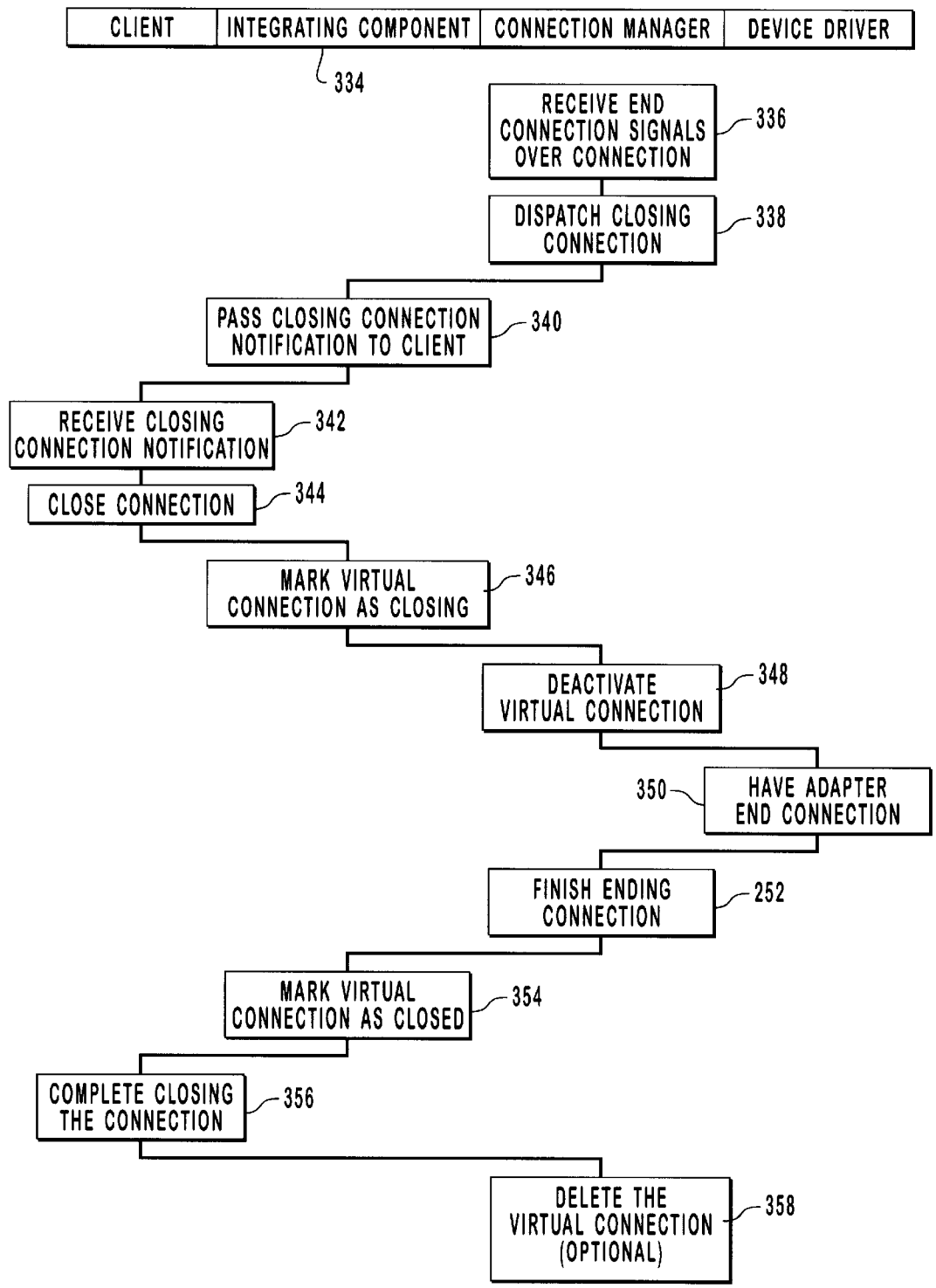
FIG. 12 is a flow chart showing the processing steps taken by the components in FIG. 6 wherein the connection manager receives an end connection indication such as would occur when the other end of a connection terminates the connection.

Referring now to FIG. 12, a flow chart showing the processing steps taken to end a connection wherein the ending of the connection is initiated by the other side of the connection is shown. The bar 334 containing the names of the various components of the system is used to indicate which particular component has processing control for each of the respective processing steps that are discussed.

Initially, the connection manager will receive end connection signals over the connection at step 336. How this is done will depend on the signaling mechanisms of the particular media types but will be known to the connection manager for that particular media type. Once the termination has been made known to the connection manager, this information is dispatched by the connection manager at step 338 to the integrating component for distribution to other associated components.

At step 340, the integrating component will receive the dispatch notification from the connection manager and pass the closing connection notification to the client. The client receives this at step 342 and begins relevant processing to close the connection. Part of this processing will entail initiating a close connection command through a subroutine call at step 344. Again, the integrating component receives the close connection call and will mark the virtual connection as closing at step 346.

The responsibility for closing the connection will then be passed to the connection manager which will deactivate the virtual connection at step 348. As part of this deactivation of the virtual connection, instructions will be passed to the device driver so that the device driver will have the adapter physically end the connection as indicated at step 350. Once the device driver has ended the connection, control passes again to the connection manager for any post processing necessary to finish ending the connection. Control is then passed to the integrating component so that notification may be made to the client and the integrating component will know that the connection manager has ended the connection.

At step 354, the integrating component receives control and marks the virtual connection as closed at step 350 before passing notification on to the client. At step 356, the client receives notification that the connection has been closed and will take any processing steps necessary to so manage a closed connection. Finally, control will pass back to the connection manager where, at step 358, the virtual connection may optionally be deleted. Note that this is an optional step and in some instances the connection manager may or may not desire to end the connection.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for separating connection management out of a connection-oriented device driver in order to simplify connection-oriented device driver development and so that a connection management functionality need not be provided by a driver developer comprising:

providing an integrating component having an abstracted connection interface that receives connection creation and management instructions, a connection management interface, and a connection-oriented device driver interface;

providing a connection manager component that interacts with the integrating component through the connection management interface, said connection manager handling all connection management for a particular media type in order to simplify the development of a connection-oriented device driver;

controlling, by a simplified connection-oriented device driver, a particular connection-oriented media adapter attached to a media and interacting with the integrating component over the connection-oriented device driver interface, said device driver having minimal functionality in order to control the adapter; and interacting, by a client, with the abstracted connection interface of the integrating component to make a connection over the media with a desired destination, wherein the integrating component will cooperate with the connection manager component and the simplified connection-oriented device driver to make the connection.

2. A method as recited in claim 1 further comprising the step of returning to the client a connection identifier that can be used for transmitting and receiving data across the connection without knowledge of the media type or other details regarding the connection.

3. A connection-oriented driver subsystem allowing connection-oriented media device drivers to be simplified by not requiring specific call management functionality to be contained therein, the driver subsystem comprising:

at least one simplified connection-oriented device driver controlling a connection media device;

at least one connection-oriented data transport protocol driver;

at least one connection manager component for making and managing connections, each connection manager component pertaining to a particular media type; and an integrating component that interfaces with the at least one simplified connection-oriented device driver, the at least one connection-oriented data transport protocol driver, and the at least one connection manager component, said integrating component:

providing an abstracted connection management interface that is available to a client that allows the client to create a connection with a desired destination using a media device controlled by the at least one simplified connection-oriented device driver and using an appropriate call manager component suited to the media type corresponding to the media device to create and manage a connection; and providing identification of a connection created by the client through the connection interface that can be used with the at least one connection-oriented data transport protocol driver thereby allowing data to be sent and received over the previously established connection without regard to media type or data type.

4. A system as recited in claim 3 wherein the integrating component is incorporated as part of an operating system.

5. A system as recited in claim 3 wherein a client may register a service access point through the connection interface of the integrating component and wherein the connection manager component will route an incoming connection to the client having previously registered a service access point that matches the incoming connection characteristics.

6. In a device driver subsystem of an operating system wherein the device driver subsystem has an integrating component that interfaces with the operating system, at least one simplified connection-oriented device driver, at least one connection-oriented transport protocol driver, and a registry through respective operating system, device driver, transport protocol, and registry interfaces, a method of sending and receiving data over a connection without regard to the underlying media type comprising the steps of:

creating, by a client component, a connection with a particular destination by interfacing with the integrating component over a connection interface, the connection interface abstracting the details of the underlying simplified device driver and associated media type;

making, by the integrating component, the connection by interfacing with both a connection manager component and the simplified connection-oriented device driver in order to make a connection over the underlying media, and returning, to the client component, a connection identifier representing the previously created connection;

receiving, by the integrating component from the at least one connection-oriented data transport protocol driver, data transmission and reception commands over the connection identified by the connection identifier.

7. A system as recited in claim 6 wherein the integrating component is incorporated as part of an operating system.

8. A computer-readable medium having computer-executable instructions for performing the steps recited in claim 6.

9. In a system including one or more applications that both send and receive data packets through one or more connection oriented media adapters, wherein each of the media adapters has a corresponding device driver that controls and manages the media adapters, and wherein each of the applications communicates with at least one of a plurality of transports, a computer program product for implementing a method of connection management for the media adapters such that connection management is abstracted from the device drivers so that device drivers are not required to support an interface to system resources, a system registry, or for the transports, the computer program product comprising:

a computer-readable medium having computer executable instructions for performing the method, the method comprising steps for:

receiving at an integrating component a virtual connection creation command and a destination from a connection manager that interfaces with the integrating component through a connection manager interface;

creating a connection between a media adapter and the destination by communicating with an associated connection-oriented device driver through the integrating component; and binding the connection manager with the media adapter in order to control the underlying media thereby simplifying the development of the connection-oriented device driver by not requiring the connection-oriented device driver to have connection management functionality contained therein.

10. In a system including one or more applications that both send and receive data packets through one or more connection oriented media adapters, wherein each of the media adapters has a corresponding device driver that controls and manages the media adapters, and wherein each of the applications communicates with at least one of a plurality of transports, a method of connection management for the media adapters such that connection management is abstracted from the device drivers so that device drivers are not required to support an interface to system resources, a system registry, or for the transports, the method comprising:

registering one or more connection managers with an integrating component through a connection management interface;

receiving at each connection manager connectivity information about each connection oriented media adapter, wherein the connectivity information comprises supported media types for each connection oriented media adapter;

identifying by each connection manager specific media adapters that will be supported;

registering by each connection manager one or more address families that will be supported for the specific media adapters, wherein each address family identifies a media type and a signaling protocol that is used by a transport to make and use a connection over the media type; and binding each connection manager with the specific media adapters by matching the one or more address families with parameters supplied by each transport.

11. A method as defined in claim 10, further comprising steps for:

registering a protocol with the integrating component;

binding the protocol with a particular media adapter using a particular address family such that the protocol and a connection manager each have an association with the particular media adapter; and sending a notification from the connection manager to the protocol that an incoming call is being received from the destination over the particular media adapter that is bound to the protocol.

12. A method as defined in claim 10, further comprising steps for:

activating the virtual connection between a particular transport and a particular device driver; and communicating data packets over the virtual connection.

13. In a system including one or more applications that both send and receive data packets through one or more connection oriented media adapters, wherein each of the media adapters has a corresponding device driver that controls and manages the media adapters, and wherein each of the applications communicates with at least one of a plurality of transports, a method of connection management for the media adapters such that connection management is abstracted from the device drivers so that device drivers are not required to support an interface to system resources, a system registry, or for the transports, the method comprising:

a step for initiating, by the connection manager, a creation of a virtual connection by issuing a function call to the integrating component, wherein the integrating component creates data structures associated with the virtual connection and assigns a connection identifier to the virtual connection;

a step for identifying the virtual connection to both the transport and the device driver by providing both the transport and the device driver with the connection identifier that enables both the device driver and the transport to transport data over the virtual connection; and a step for activating the virtual connection when the connection manager issues a command to the device driver of the media adapter to make a connection over a media, wherein the activated virtual connection completes the physical connection such that the data packets can be sent and received through the media adapter.

14. A method as defined in claim 13, wherein the step for initiating, by the connection manager, a creation of a virtual connection by issuing a function call to the integrating component, wherein the integrating component creates data structures associated with the virtual connection and assigns a connection identifier to the virtual connection further comprises a step for interfacing the connection manager with the integrating component through a connection manager interface.

15. A method as defined in claim 13, wherein the step initiating, by the connection manager, a creation of a virtual connection by issuing a function call to the integrating component, wherein the integrating component creates data structures associated with the virtual connection and assigns a connection identifier to the virtual connection further comprises a step for providing the transport with one or more address families and signaling protocols for use with a particular media adapter.

16. A method as defined in claim 14, wherein a step for activating the virtual connection when the connection manager issues a command to the device driver of the media adapter to make a connection over a media, wherein the activated virtual connection completes the physical connection such that the data packets can be sent and received through the media adapter further comprises:

a step for binding the connection manager with the device driver; and a step for binding a transport with the device driver, whereby the device driver, the transport, and the connection manager are bound.

17. In a system including a client that communicates with an application and a device driver that controls and manages a media adapter, a method for creating a connection over a media type supported by the media adapter such that data can be sent or received over the connection without the client being aware of the connection details, the method comprising:

creating a virtual connection by the client, wherein a data structure for use by the virtual connection is created by an integrating component;

providing a connection manager and the device driver with a connection identifier that identifies the virtual connection;

when the client initiates the connection, activating the virtual connection by issuing commands to the device driver that cause the media adapter to physically connect with a destination such that the connection, which includes the virtual connection and the physical connection, is established; and when the connection manager receives notification that the media adapter is physically connected with the destination, providing the client with notice that the media adapter is physically connected with the destination, whereby the client may send and receive data packets over the established connection using the connection identifier.

\* \* \* \* \*

UNITED STATES PATENT AND TRADEMARK OFFICE
CERTIFICATE OF CORRECTION

PATENT NO. : 6,378,005 B1
DATED : April 23, 2002
INVENTOR(S) : Jameel Hyder and Arvind Madhav Murching It is certified that error appears in the above-identified patent and that said Letters Patent is hereby corrected as shown below:

Column 15,
Line 58, after "connection in order to" change "asses" to -- assess --

Column 16,
Line 30, after "Again, this is done" delete "is done"
Line 50, before "connection." change "previously" to -- previous --

Column 18,
Line 15, after "to the connection" change "(ibe.," to -- (i.e., --

Column 20,
Line 1, after "steps necessary to" delete "so"

Signed and Sealed this

Eighth Day of October, 2002

Attest:

JAMES E. ROGAN
Attesting Officer
Director of the United States Patent and Trademark Office